United States Patent
Ye et al.

(10) Patent No.: US 12,501,059 B2
(45) Date of Patent: Dec. 16, 2025

(54) SYSTEMS AND METHODS FOR DETERMINING CHROMA SAMPLES IN AN INTRA PREDICTION MODE OF VIDEO CODING

(71) Applicant: Tencent America LLC, Palo Alto, CA (US)

(72) Inventors: Jing Ye, Palo Alto, CA (US); Xin Zhao, Palo Alto, CA (US); Liang Zhao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 68 days.

(21) Appl. No.: 18/142,414

(22) Filed: May 2, 2023

(65) Prior Publication Data

US 2023/0379479 A1    Nov. 23, 2023

Related U.S. Application Data

(60) Provisional application No. 63/343,024, filed on May 17, 2022.

(51) Int. Cl.
*H04N 19/186*    (2014.01)
*H04N 19/176*    (2014.01)
*H04N 19/593*    (2014.01)

(52) U.S. Cl.
CPC ......... *H04N 19/186* (2014.11); *H04N 19/176* (2014.11); *H04N 19/593* (2014.11)

(58) Field of Classification Search
None
See application file for complete search history.

(56) References Cited

U.S. PATENT DOCUMENTS

| | | | |
|---|---|---|---|
| 2020/0389650 A1* | 12/2020 | Laroche | H04N 19/189 |
| 2021/0092395 A1* | 3/2021 | Zhang | H04N 19/132 |
| 2021/0235072 A1 | 7/2021 | Ko et al. | |
| 2022/0086428 A1 | 3/2022 | Lim et al. | |

(Continued)

OTHER PUBLICATIONS

Tencent Technology, ISRWO, PCT/US2023/020896, Jul. 27, 2023, 9 pgs.

(Continued)

*Primary Examiner* — Mohammed Jebari
(74) *Attorney, Agent, or Firm* — Morgan, Lewis & Bockius LLP

(57) ABSTRACT

The various implementations described herein include methods and systems for coding video (e.g., decoding video data). In one aspect, a method includes identifying, in a current frame, a current coding block and one or more neighboring coding blocks. The current coding block has a first luma sample. The method further includes identifying a plurality of candidate luma samples within the one or more neighboring coding blocks for the first luma sample. The one or more neighboring coding blocks are coded in 4:2:0 chroma color format. The method further includes identifying a target luma sample among the plurality of candidate luma samples including a 2×2 luma block and determining a first chroma sample co-located with the first luma sample based on a target chroma sample co-located with the target luma sample in the one or more neighboring coding blocks.

19 Claims, 11 Drawing Sheets

(56) References Cited

U.S. PATENT DOCUMENTS

| | | | |
|---|---|---|---|
| 2022/0150502 A1* | 5/2022 | Zhang | H04N 19/11 |
| 2022/0312008 A1* | 9/2022 | Wang | H04N 19/82 |
| 2023/0041999 A1* | 2/2023 | Lee | H04N 19/186 |
| 2023/0050376 A1* | 2/2023 | Filippov | H04N 19/176 |
| 2023/0062509 A1* | 3/2023 | Blanch | G06N 3/02 |
| 2024/0333956 A1* | 10/2024 | Kuo | H04N 19/132 |
| 2025/0024058 A1* | 1/2025 | Kuo | H04N 19/70 |

OTHER PUBLICATIONS

Luc N. Trudeau et al., "Predicting Chroma from Luma in AV1", 2018 Data Compression Conference, 2018 IEEE, 9 pgs.
Peter de Rivaz et al., "AV1 Bitstream & Decoding Process Specification", The Alliance for Open Media, Jan. 8, 2019, 681 pgs.
Yue Chen et al., "An Overview of Core Coding Tools in the AV1 Video Codec", 2018 IEEE, 5 pgs.

\* cited by examiner

SYSTEMS AND METHODS FOR DETERMINING CHROMA SAMPLES IN AN INTRA PREDICTION MODE OF VIDEO CODING

RELATED APPLICATIONS

This application claims priority to U.S. Provisional Patent Application No. 63/343,024, entitled "Chroma from Luma Intra Prediction Mode Complexity Reduction," filed May 17, 2022, which is hereby incorporated by reference in its entirety.

TECHNICAL FIELD

The disclosed embodiments relate generally to video coding, including but not limited to systems and methods for determining chroma samples in a coding block based on chroma samples of one or more neighboring coding blocks in intra prediction of video data.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes determining chroma samples in a current coding block based on chroma samples of one or more neighboring coding blocks in an intra prediction mode of video coding. In some embodiments associated with a chroma from luma (CfL) mode, chroma samples of the current coding block are predicted from co-located luma samples, e.g., based on a linear relationship, while neighboring samples of the co-located luma samples are not used to determine the chroma samples of the current coding block. Stated another way, CfL generally refers to a coding tool that predicts information in the chromatic planes based on previously encoded information in a luma plane by implementing a linear model on luma pixels. Additionally, in some embodiments of this application, target luma samples are identified in the one or more neighboring coding blocks for luma samples in the current coding block, and target chroma samples co-located with the target luma samples in the one or more neighboring coding blocks are applied to determine the chroma samples co-located with the chroma samples in the current coding block. By these means, the chroma samples of the current coding block are determined based on the target chroma samples of the neighboring coding blocks without relying on the linear relationship between the luma and chroma samples of the current coding block, which thereby helps conserve computing and storage resources during video coding.

In accordance with some embodiments, a method of video coding (e.g., video encoding) is provided. The method includes identifying, in a current frame, a current coding block and one or more neighboring coding blocks. The current coding block has a first luma sample. The method further includes identifying a plurality of candidate luma samples within the one or more neighboring coding blocks for the first luma sample. The one or more neighboring coding blocks are coded in a 4:2:0 chroma color format. The method further includes identifying one target luma sample among the plurality of candidate luma samples and determining a first chroma sample co-located with the first luma sample based on a target chroma sample co-located with the target luma sample in the one or more neighboring coding blocks. The target luma sample includes a 2×2 luma block.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes determining chroma samples in a current coding block based on chroma samples of one or more neighboring coding blocks in an intra prediction mode of video coding. Target luma samples are identified in the one or more neighboring coding blocks for luma samples of the current coding block, and target chroma samples co-located with the target luma samples in the one or more neighboring coding blocks are applied to determine the chroma samples co-located with the chroma samples in the current coding block. As such, the chroma samples of the current coding block are determined based on the target chroma samples of the neighboring coding blocks without implementing a linear relationship on the luma and chroma samples of the current coding block, which helps conserve computing and storage resources during video coding.

Figure 1:
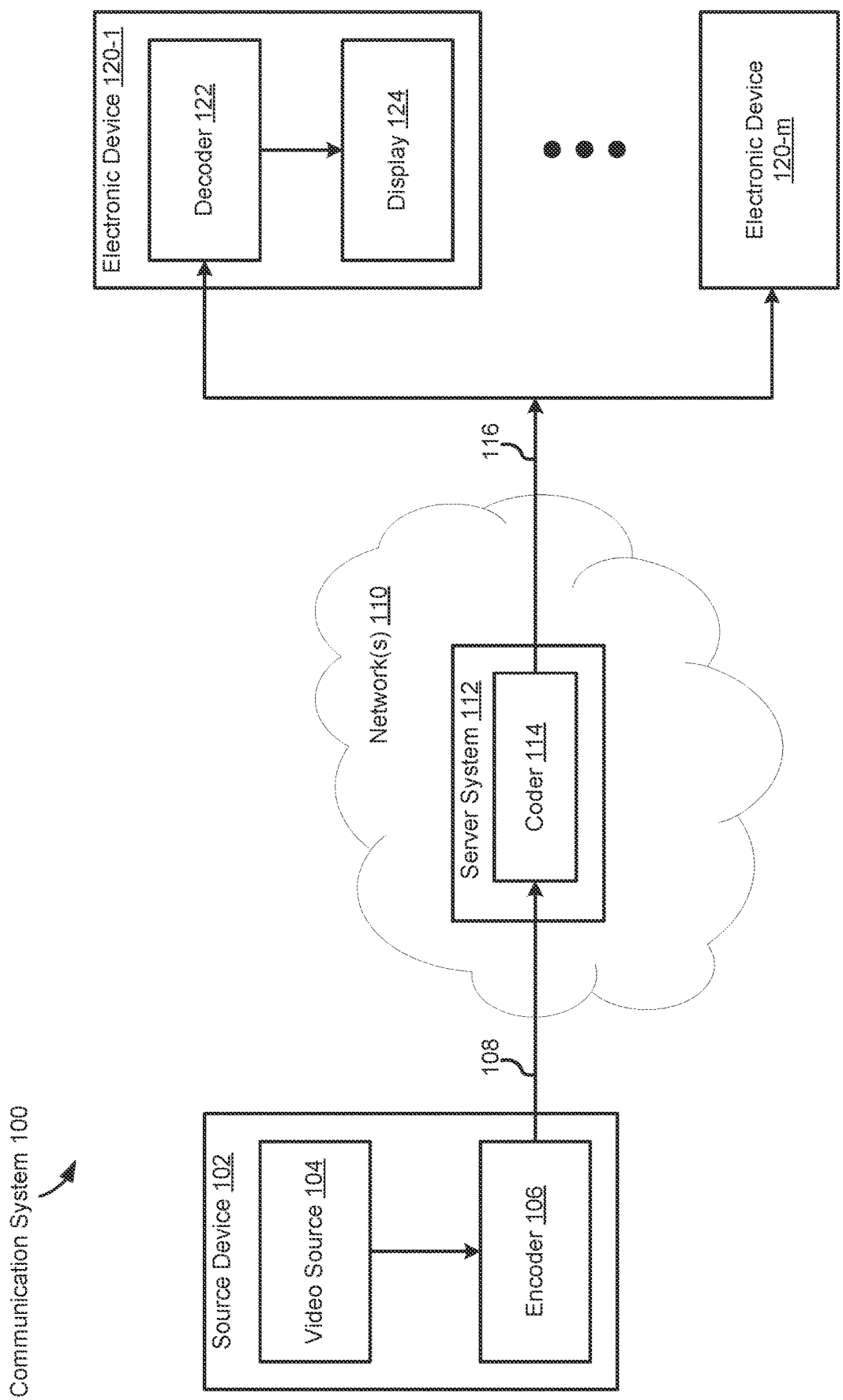
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packetswitched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

Figure 2A:
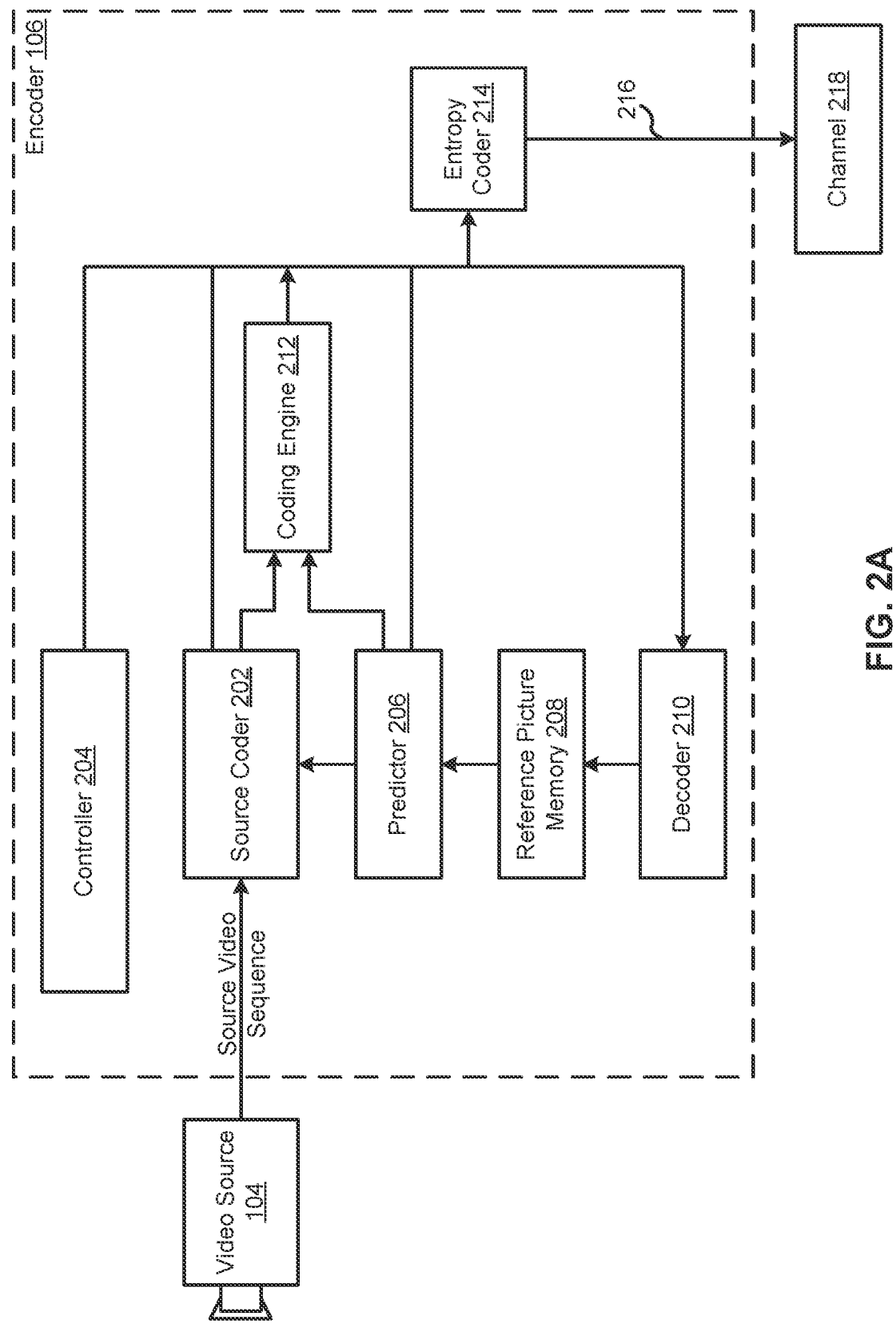
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any color space (e.g., BT.601 Y CrCb, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
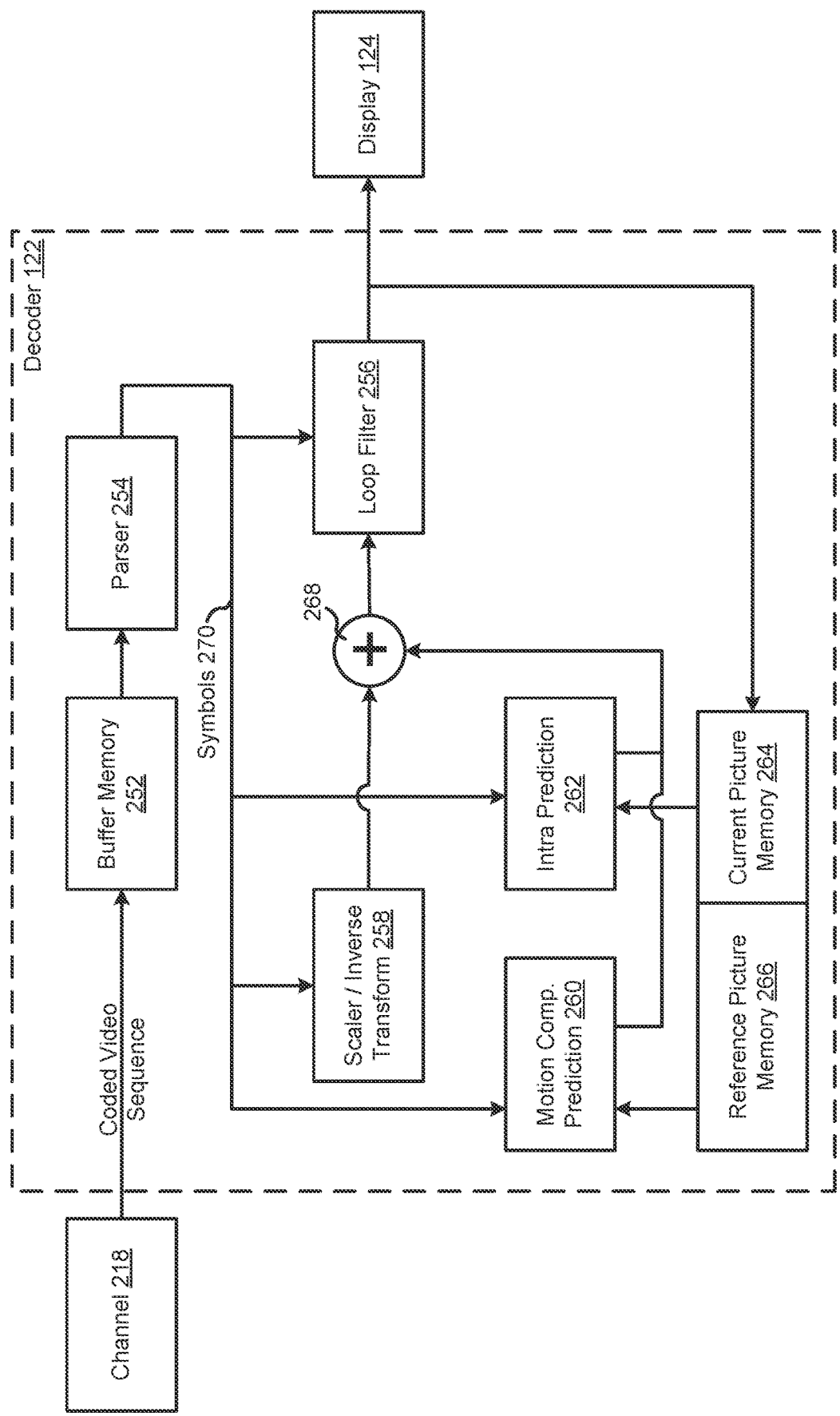
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
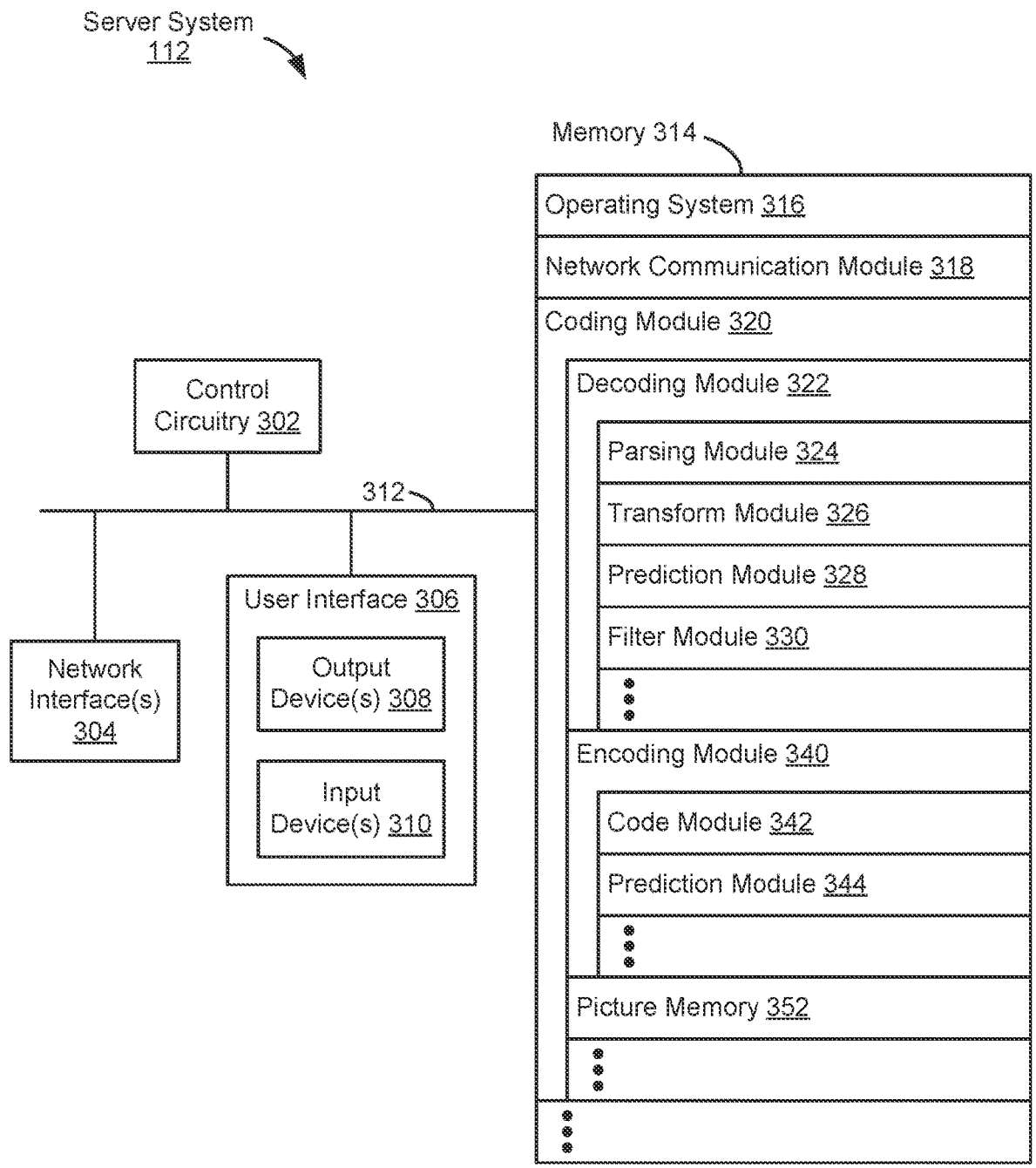
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);

a coding module 320 for performing various functions with respect to encoding and/or decoding data, such as video data. In some embodiments, the coding module 320 is an instance of the coder component 114. The coding module 320 including, but not limited to, one or more of:

a decoding module 322 for performing various functions with respect to decoding encoded data, such as those described previously with respect to the decoder component 122; and an encoding module 340 for performing various functions with respect to encoding data, such as those described previously with respect to the encoder component 106; and a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4A:
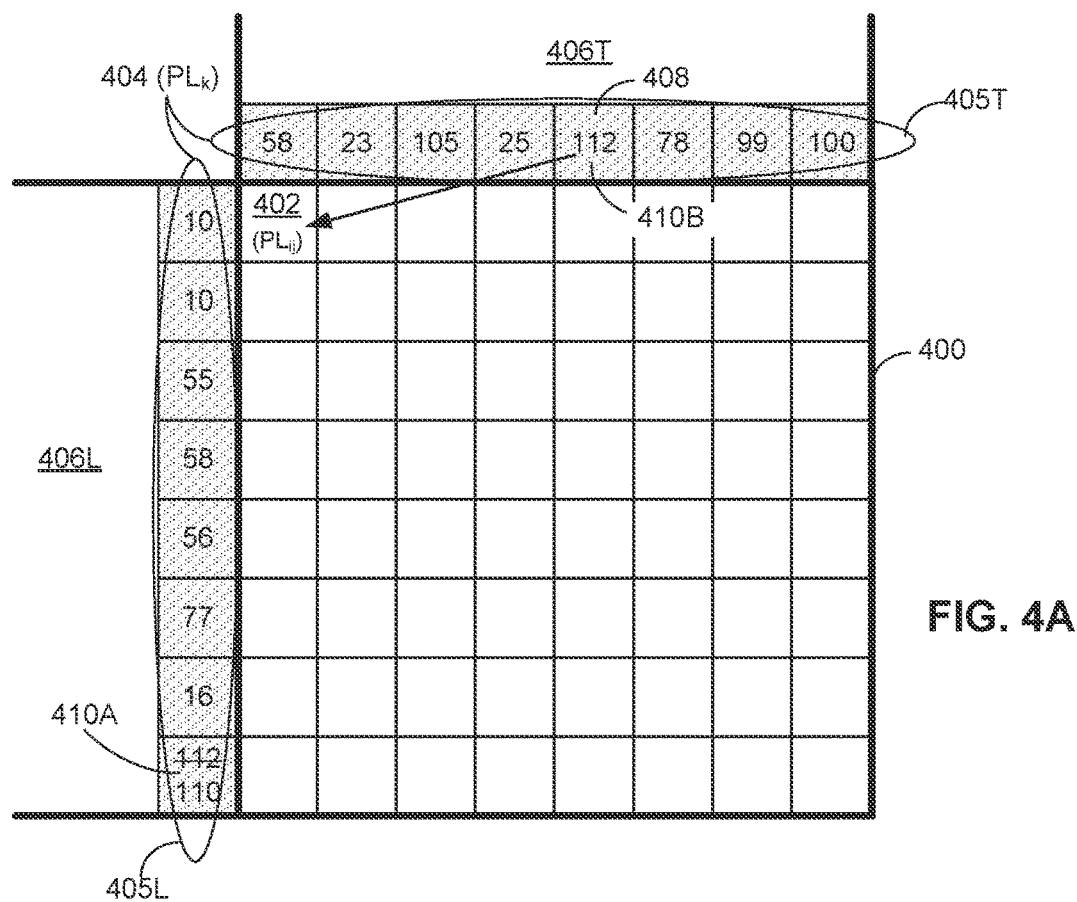
FIG. 4A is an example current coding block including a plurality of luma samples that are associated with candidate luma samples located in one or more neighboring coding blocks, in accordance with some embodiments.
Figure 4B:
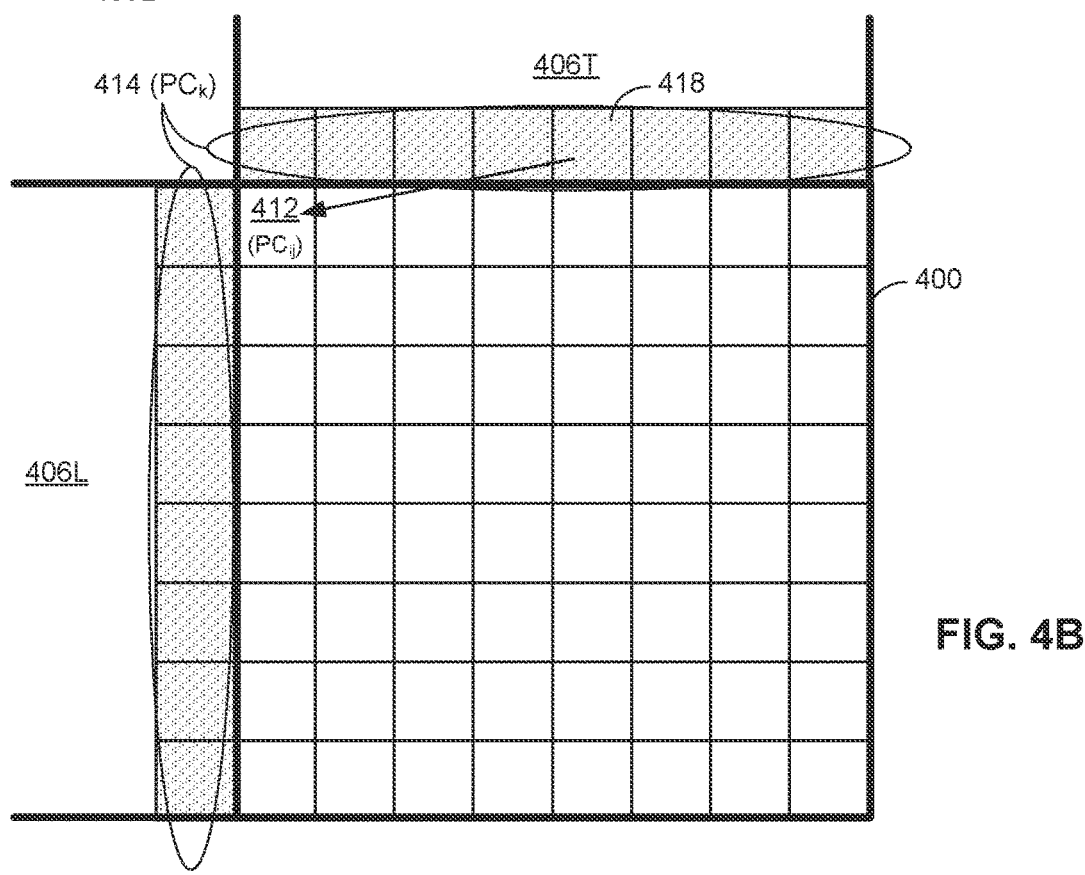
FIG. 4B is a plurality of chroma samples that are co-located with the plurality of luma samples in the current coding block 400, in accordance with some embodiments.

FIG. 4A is an example current coding block 400 including a plurality of luma samples 402 that are associated with candidate luma samples 404 located in one or more neighboring coding blocks 406, in accordance with some embodiments, and FIG. 4B is a plurality of chroma samples 412 that are co-located with the plurality of luma samples 402 in the current coding block 400, in accordance with some embodiments. A GOP includes a sequence of image frames. The plurality of image frames includes a current image frame that further includes the current coding block 400. The current image frame including the current coding block 400 is encoded in an intra prediction mode. In accordance with the intra prediction mode, pixels of the current coding blocks 400 are predicted from pixels belonging to one or more neighboring coding blocks 406 that surround the current coding block 400. The current coding block 400 is immediately adjacent to, and shares a respective boundary with, each of the one or more neighboring coding blocks 406. In some embodiments, the one or more neighboring coding blocks 406 include a top coding block 406T that is immediately on top of the current coding block 400 and shares a top boundary of the current coding block 400. In some embodiments, the one or more neighboring coding blocks 406 include a left coding block 406L that is immediately to the left of the current coding block 400 and shares a left boundary of the current coding block 400.

Referring to FIG. 4A, the current coding block 400 includes a plurality of luma samples that further includes a first luma sample 402 located at a sample position (i, j), e.g., (0, 0). Based on a predefined sample selection policy, the plurality of candidate luma samples 404 is identified within the one or more neighboring coding blocks 406 for the first luma sample 402. For example, the plurality of candidate luma sample 404 includes all luma samples in a bottom row of luma samples 405T of the top neighboring coding block 406T, a rightmost column of luma samples 405L of the top neighboring coding block 406T, or both. Each of the plurality of candidate luma samples 404 is immediately adjacent to a respective top or left boundary of the current coding block 400. A target luma sample 408 is identified among the plurality of candidate luma samples 404. In some embodiments, the one or more neighboring coding blocks 406 are coded in a 4:2:0 chroma color format, and the target luma sample 408 includes a 2×2 luma block. In some embodiments, the target luma sample 408 is identified in accordance with a determination that the target luma sample 408 is closer to the first luma sample 402 in magnitude than any remaining luma sample in the plurality of candidate luma samples 404. For example, the first luma sample 402 has a luma value of 111, and the target luma sample 408 has a luma value of 112, which is closest to 111 among the plurality of candidate luma samples 404 in FIG. 4A.

Referring to FIG. 4B, the current coding block 400 further includes a plurality of chroma samples each of which is co-located with a respective one of the plurality of luma samples. The plurality of chroma samples includes a first chroma sample 412 that is co-located with the first luma sample 402. The one or more neighboring coding blocks 406 also include a target chroma sample 418 that is co-located with the target luma sample 408 identified from the plurality of candidate luma samples 404 in FIG. 4A. The first chroma sample 412 is determined based on the target chroma sample 418 co-located with the target luma sample 408 in the one or more neighboring coding blocks 406. Stated another way, after the target luma sample 408 is identified, the corresponding target chroma sample 418 is copied to the first chroma sample 412 co-located with the first luma sample 402.

In some embodiments, a subset of candidate luma samples 410 (e.g., 410A and 410B) is identified from the plurality of candidate luma samples 404, in accordance with a determination that the subset of candidate luma samples 410 differ equally from the first luma sample in magnitude, and are closer to the first luma sample in magnitude than any remaining luma sample in the plurality of candidate luma samples 404. The target luma sample 408 is selected from the subset of candidate luma samples based on a distance of the target luma sample 408 from the first luma sample 402. Specifically, in some embodiments, for each of the subset of candidate luma samples 410, a respective distance is determined between the first luma sample 402 and the respective candidate luma sample 410. In accordance with a determination that a distance of one of the subset of candidate luma samples 410 is smallest among respective distances of the subset of candidate luma samples, the one of the subset of candidate luma samples (e.g., 410B) is selected as the target luma sample 408. Referring to FIG. 4A, in an example, both luma samples 410A and 410B have the same luma values of 112. In another example, the luma samples 410A and 410B have luma values of 110 and 112, respectively. The luma samples 410A and 410B differ from the first luma sample 402 (e.g., having a luma value of 111) equally in magnitude, and are closest to the first luma sample 402 in magnitude among the plurality of candidate luma samples 404. The candidate luma sample 410B is selected as the target luma sample 408 in accordance with a determination that the candidate luma sample 410B is closer to the first luma sample 402 in distance than the candidate luma sample 410A.

During encoding, an encoder 106 identifies a coding block mode of the current coding block 400. In accordance with a determination that the coding block mode is a chroma copying mode, the encoder 106 (specifically, a coding engine 212 in FIG. 2A) determines that the first chroma sample 412 based on the target chroma sample 418 co-located with the target luma sample 408 in the one or more neighboring coding blocks 406 of the current coding block 400. During decoding, a decoder 122 receives a data stream of video data and identifies a coding block mode of the current coding block 400. In accordance with a determination that the coding block mode is the chroma copying mode, the decoder 122 (specifically, an intra prediction unit 262 in FIG. 2B) determines that the first chroma sample 412 based on the target chroma sample 418 co-located with the target luma sample 408 in the one or more neighboring coding blocks 406 of the current coding block 400. By these means, the first chroma sample 412 is copied from an existing target chroma sample 418 of one or more neighboring coding blocks 406 after some comparison operations, and no arithmetic operations of addition or multiplication are involved, thereby conserving computing and storage resources during video coding.

Figure 5:
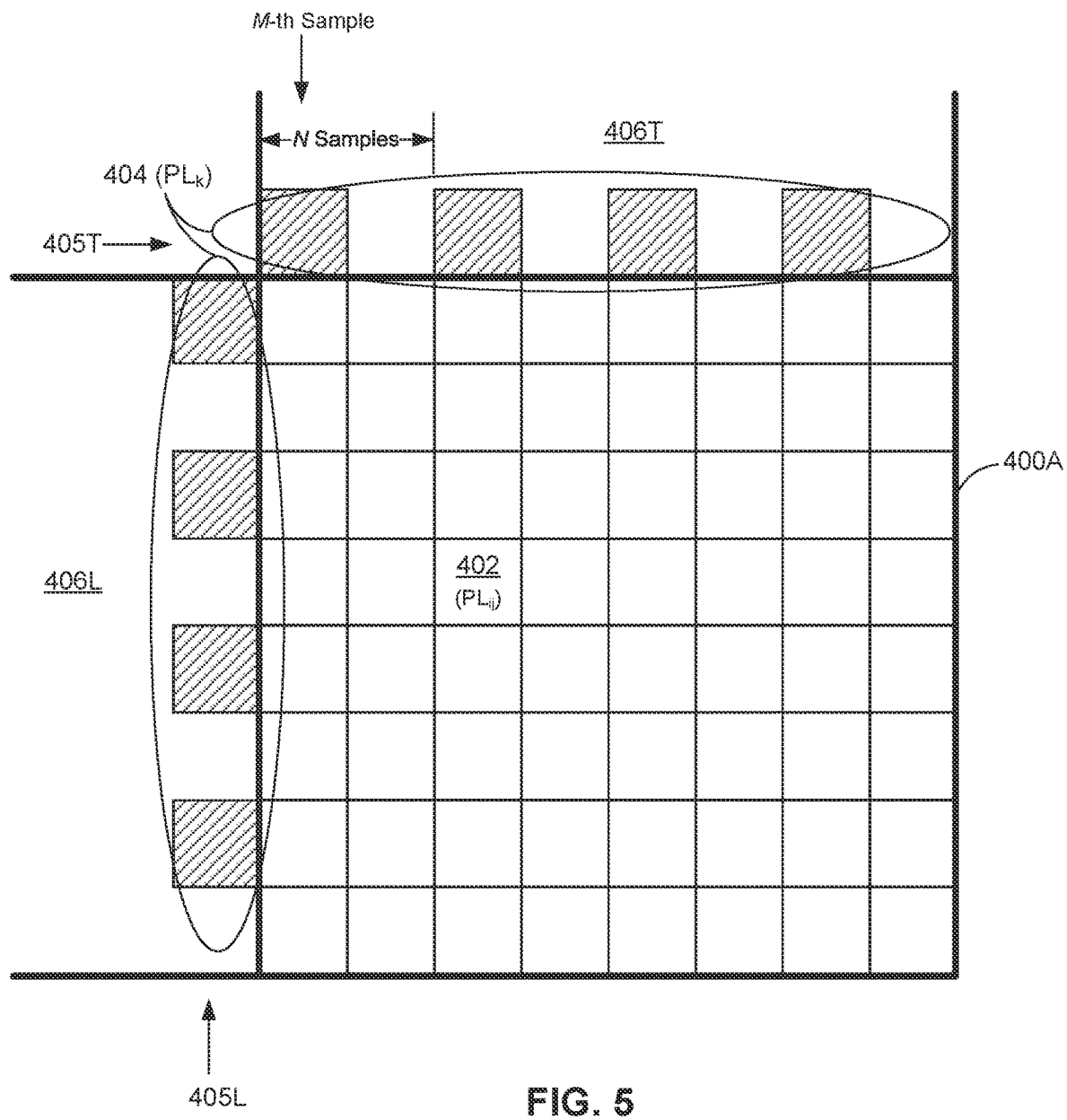
FIGS. 5-7 are three example current coding blocks each corresponding to a distinct predefined sample selection policy, in accordance with some embodiments, in accordance with some embodiments.
Figure 6:
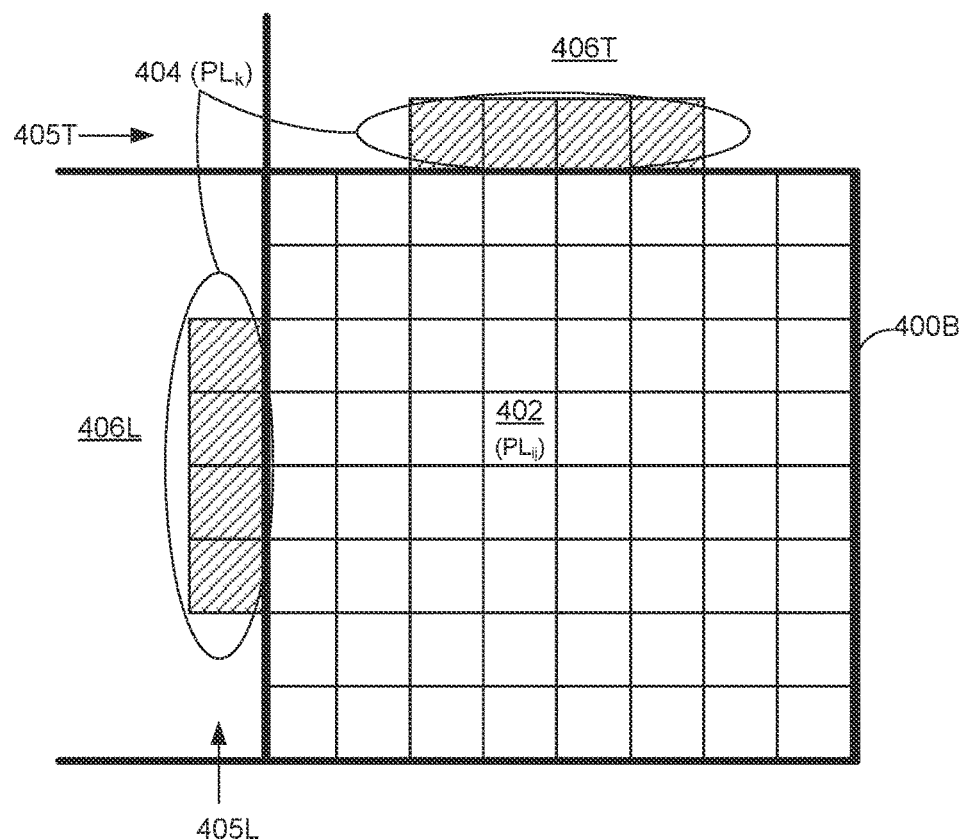
Figure 7:
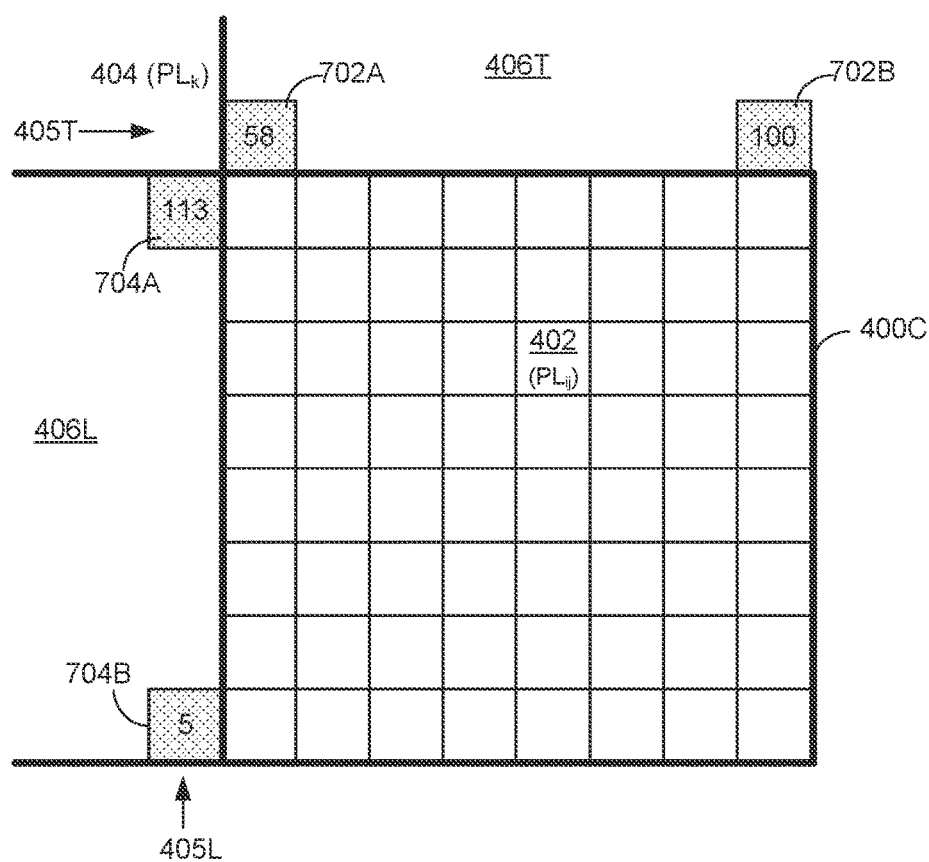

FIGS. 5-7 are three example current coding blocks 400A, 400B, and 400C each corresponding to a distinct predefined sample selection policy, in accordance with some embodiments, in accordance with some embodiments. For each current coding block 400A, 400B, or 400C, the distinct predefined sample selection policy is applied to identify a plurality of candidate luma samples 404 in one or more neighboring coding blocks 406 of the current coding block 400A, 400B, or 400C. Referring to FIG. 5, in some embodiments, one of every two candidate luma samples of a bottom row of luma samples 405T of a top neighboring coding block 406T and a rightmost column of luma samples 405L of a left neighboring coding block 406L is used as a candidate luma sample 404 to determine a target luma sample 408 for each luma sample of the current coding block 400A. In some situations, a first luma sample 402 is located at an even-numbered column or an even-numbered row of the current coding block 400. Even-numbered luma samples of the bottom row of the top neighboring coding block 406T and even-numbered luma samples of the rightmost column of the left neighboring coding block 406L are used as candidate luma samples 404 from which the target luma sample 408 is selected for the first luma sample 402 in the current coding block 400A. Conversely, in some situations, the first luma sample 402 is located at an intersection of an odd-numbered column and an odd-numbered row of the current coding block 400. Odd-numbered neighboring luma samples of the bottom row of the top neighboring coding block 406T and odd-numbered neighboring luma samples of the rightmost column of the left neighboring coding block 406L are used as the candidate luma samples 404 from which the target luma sample 408 is selected for the first luma sample 402 in the current coding block 400A.

In some embodiments, the plurality of candidate luma samples 404 includes an M-th luma sample of every N luma samples of a bottom row of luma samples 405T of the top neighboring coding block 406T or a rightmost column of luma samples 405L of the left neighboring coding block 406L, where N is an integer greater than 1, and M is a positive integer that is smaller than or equal to N. For example, in FIG. 5, M and N are equal to 1 and 2, respectively. The candidate luma samples 404 include the first sample of every 2 luma samples of the bottom row of luma samples 405T and the rightmost column of luma samples 405L. In some embodiments, Nis equal to an integer power of 2 (e.g., 2, 4, 8, 16, etc.) and less than a total number of luma samples in the bottom row of luma samples 405T of the top neighboring coding block 406T. For example, the third luma sample of every 4 luma samples of the bottom row of luma samples 405T and the rightmost column of luma samples 405L is selected as a candidate luma sample 404.

Referring to FIG. 6, in some embodiments, independently of the position (i, j) of the first luma sample 402, the plurality of candidate luma samples 404 includes a set of K luma samples in the middle of a bottom row of luma samples 405T of the top neighboring coding block 406T or a set of L luma samples in the middle of a rightmost column of luma samples 405L of the left neighboring coding block 406T, where K and L are positive integers. For example, both K and L are equal to 4. For the first luma sample 402, the corresponding target luma sample 408 is selected from the set of K luma samples of the top neighboring coding block 406T and the set of L luma samples of the left neighboring coding block 406L, e.g., 8 candidate luma samples 404 in total in FIG. 6.

Referring to FIG. 7, in some embodiments, independently of the position (i, j) of the first luma sample 402, the plurality of candidate luma samples 404 includes two sets of P luma samples 702A and 702B at two ends of a bottom row of luma samples 405T of the top neighboring coding block 406T or two set of Q luma samples 704A and 704B at two ends of a rightmost column of luma samples 405L of the left neighboring coding block 406L, where P and Q are positive integers. P and Q are optionally equal to or distinct from each other. For example, both P and Q are equal to 1 in FIG. 7. For the first luma sample 402, the corresponding target luma sample 408 is selected from four candidate luma samples 702A, 702B, 704A, and 704B.

Figure 8A:
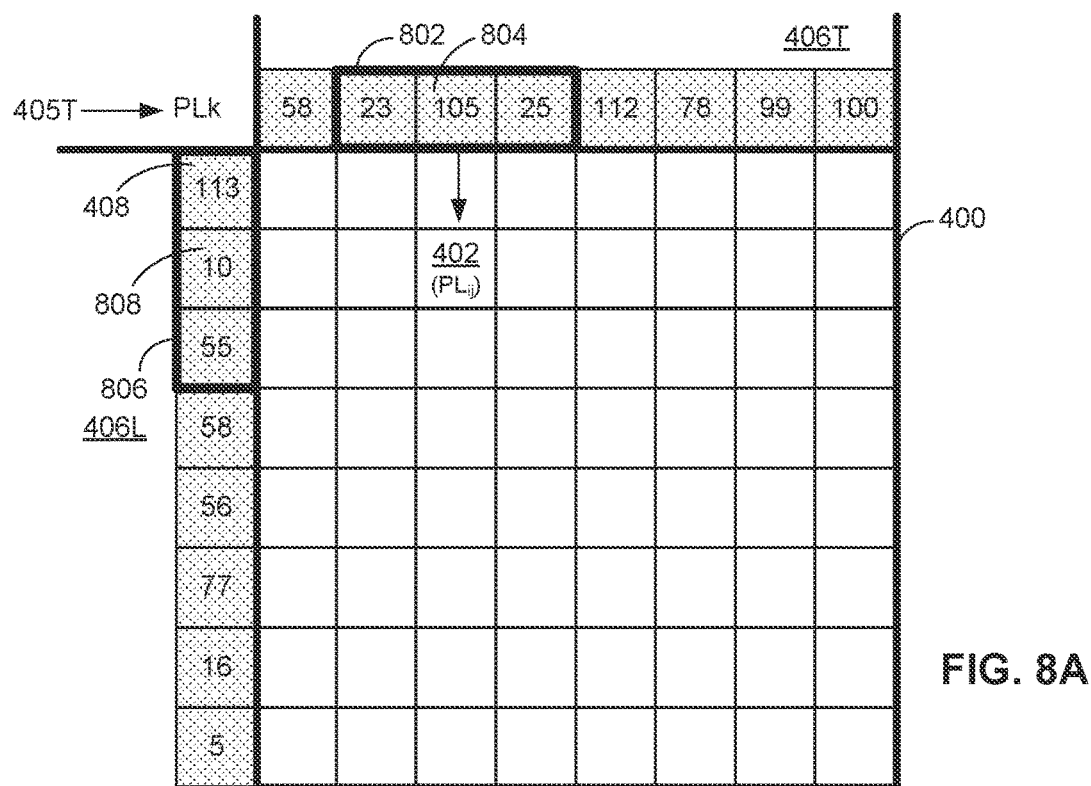
FIG. 8A is an example current coding blocks corresponding to position-based candidate luma samples 404 located in one or more neighboring coding blocks, in accordance with some embodiments.
Figure 8B:
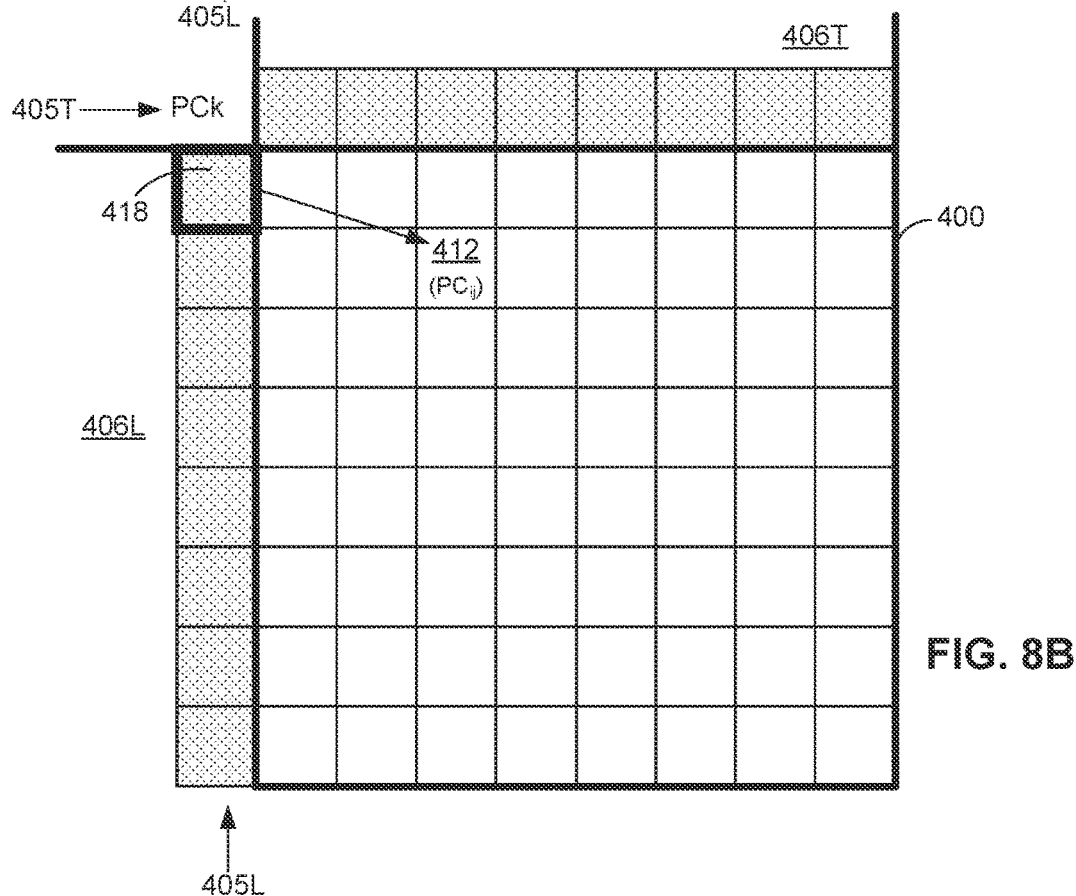
FIG. 8B is a plurality of chroma samples in the current coding block in FIG. 8A, in accordance with some embodiments.
Figure 9A:
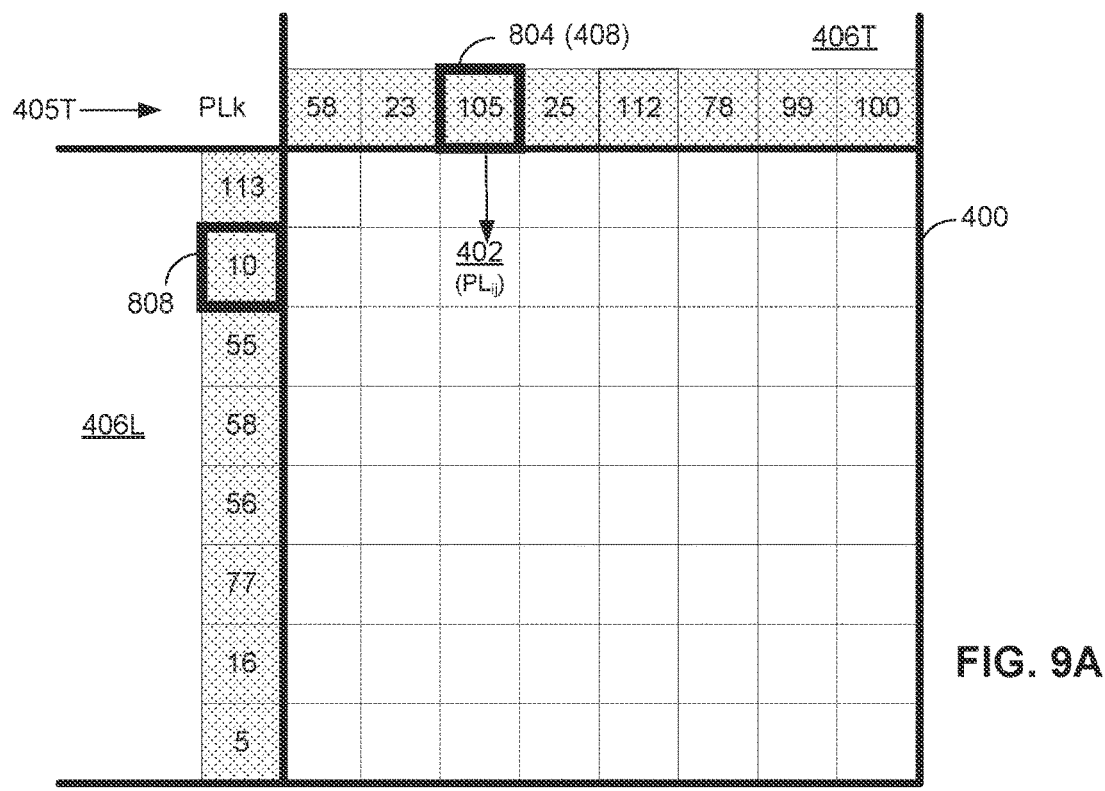
FIG. 9A is another example current coding blocks corresponding to position-based candidate luma samples located in one or more neighboring coding blocks, in accordance with some embodiments.
Figure 9B:
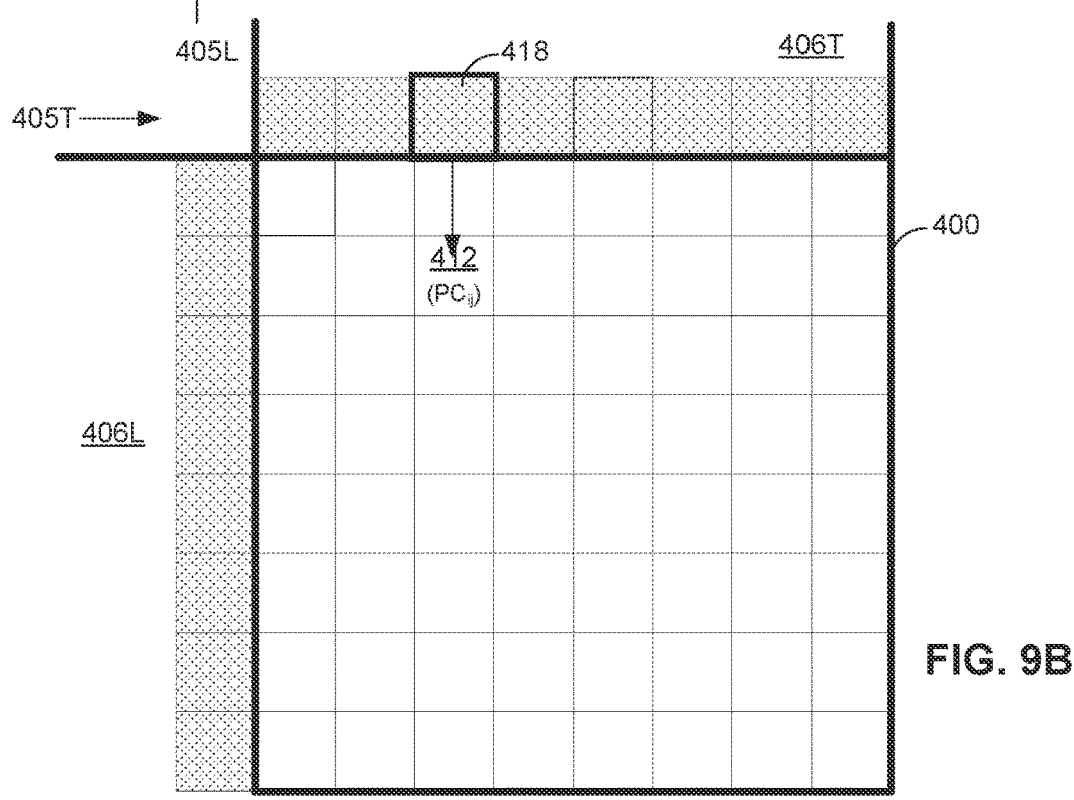
FIG. 9B is a plurality of chroma samples in the current coding block in FIG. 9A, in accordance with some embodiments.

FIG. 8A is an example current coding blocks 400 corresponding to position-based candidate luma samples 404 located in one or more neighboring coding blocks 406, in accordance with some embodiments, and FIG. 8B is a plurality of chroma samples 412 in the current coding block 400 in FIG. 8A, in accordance with some embodiments. FIG. 9A is another example current coding blocks 400 corresponding to position-based candidate luma samples 404 located in one or more neighboring coding blocks 406, in accordance with some embodiments, and FIG. 9B is a plurality of chroma samples 412 in the current coding block 400 in FIG. 9B, in accordance with some embodiments. In some embodiments, the predefined sample selection policy applied to identify a plurality of candidate luma samples 404 is based on a position of the first luma sample 402 in the current coding block 400, and the plurality of candidate luma samples 404 is identified at least partially based on the position of the first luma sample 402. In some embodiments, in accordance with the predefined sample selection policy, the one or more neighboring coding blocks 406 include a top neighboring coding block 406T or a left neighboring coding block 406L. The plurality of candidate luma samples 404 includes an odd number X of luma samples (e.g., 3 luma samples 802) including a first central luma sample 804 in a bottom row of luma samples 405T of the top neighboring coding block 406T. The plurality of candidate luma samples 404 further includes an odd number Y of luma samples (e.g., 3 luma samples 806) including a second central luma sample 808 in a rightmost column of luma samples 405L of the left neighboring coding block 406L. The first central luma sample 804 is aligned with the first luma sample 402 along a column direction, and the second central luma sample 808 is aligned with the first luma sample 402 along a row direction.

In some embodiments not shown, the odd numbers X and Y are distinct from each other, e.g., equal to 3 and 5, respectively. Alternatively, referring to FIG. 8A, in some embodiments, the odd numbers X and Y are equal to each other, e.g., equal to 3. A target luma sample 408 is determined among 6 candidate luma samples 802 and 806, e.g., in accordance with a determination that the target luma sample 408 (e.g., having a luma value of 113) is closer to the first luma sample 402 (e.g., having a luma value of 111) in magnitude than any remaining luma samples (e.g., having luma values of 10, 55, 23, 105, and 25) in the plurality of candidate luma samples 404. A target chroma sample 418 is co-located with the target luma sample 408 in the left neighboring coding block 406L. Referring to FIG. 8, a first chroma sample 412 is co-located with the first luma sample 402 and is determined based on the target chroma sample 418.

In an example, referring to FIG. 9A, the odd numbers X and Y are both equal to 1, and the plurality of candidate luma samples 404 includes the first central luma sample 804 and the second central luma 808. A target luma sample 408 is determined among 2 candidate luma samples 804 and 808, e.g., in accordance with a determination that the target luma sample 408 (e.g., having a luma value of 105) is closer to the first luma sample 402 (e.g., having a luma value of 111) in magnitude than the second central luma sample 808 (e.g., having a luma value of 10) in the plurality of candidate luma samples 404. A target chroma sample 418 is co-located with the target luma sample 408 in the top neighboring coding block 406T. Referring to FIG. 9B, a first chroma sample 412 is co-located with the first luma sample 402 and is determined based on the target chroma sample 418.

Figure 10:
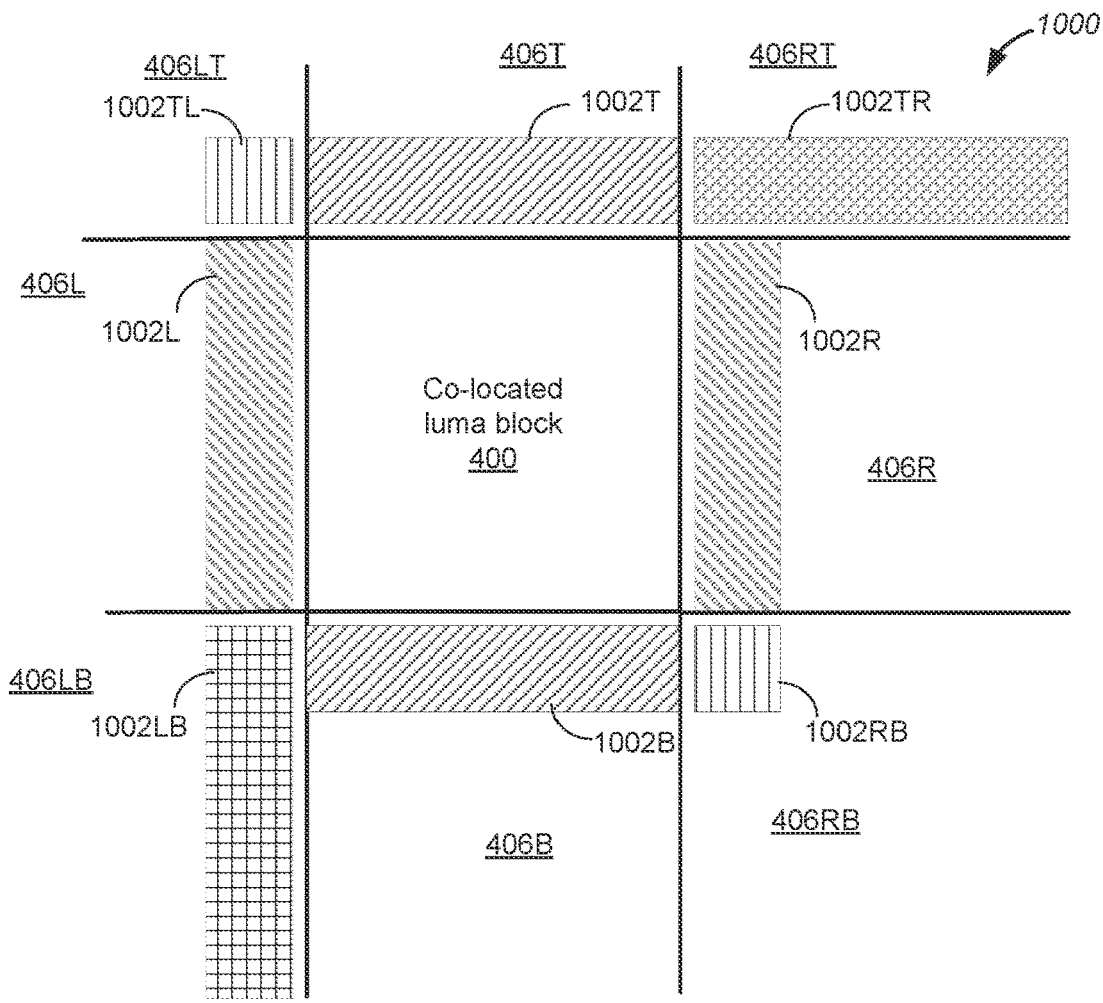
FIG. 10 is a block environment in which an example current coding block is immediately adjacent to neighboring samples of neighboring coding blocks, in accordance with some embodiments.

FIG. 10 is a block environment 1000 in which an example current coding block 400 is immediately adjacent to neighboring samples 1002 (e.g., 1002TL, 1002T, 1002TR, 1002L and 1002LB) of neighboring coding blocks 406, in accordance with some embodiments. A target chroma sample 418 (FIG. 4B) is co-located with, and determined based on, a target luma sample 408 (FIG. 4A) in a neighboring coding block 406 as follows:

$$C_T = \alpha \times L_{T,AC} + C_{DC} \quad (1)$$

where $C_T$ is the target chroma sample 418, $L_T$ is the target luma sample 408, $\alpha$ is a linear model parameter, $L_{T,AC}$ is an AC component of the target luma sample 408, and $C_{DC}$ is a DC component of the target chroma sample 408. In some embodiments, a subset of the neighboring samples 1002 is applied to determine the target chroma sample 418 in the neighboring coding block 406 from the target luma sample 408, e.g., by determining the AC component of the target luma sample 408 ($L_{T,AC}$) and/or the DC component of the target chroma sample 418 ($C_{DC}$). The neighboring samples 1002 correspond to one or more of: neighboring samples 1002L, 1002T, 1002R, 1002B, 1002LT, 1002LB, 1002RT, and 1002RB located in left, top, right, bottom, top-left, bottom-left, top-right, and bottom-right neighboring coding blocks 406L, 406T, 406R, 406B, 406LT, 406LB, 406RT, and 406RB, respectively. The neighboring samples 1002 are applied to determine the target chroma sample 418 in CfL prediction based on equation (1), and the target chroma sample 418 is optionally identified in a subset of the left, top, right, bottom, top-left, bottom-left, top-right, and bottom-right neighboring coding blocks 406L, 406T, 406R, 406B, 406LT, 406LB, 406RT, and 406RB. The first chroma sample 402 is further determined from the target chroma sample 418. In an example, only the neighboring samples 1002L, 1002T, and 1002LT located in the coding blocks 406L, 402T, and 402LT are applied to determine the target chroma sample 418 and the first chroma sample 402.

In some embodiments, selection of neighboring samples 1002 used in CfL prediction is explicitly signaled or implicitly derived based on coded information, such as an intra prediction mode defining a co-located luma block, a block shape, a block size, and/or a block aspect ratio. In some embodiments, when only the top neighboring samples 1002T is available, the above neighboring samples 1002T are used in CfL prediction to determine the target chroma sample 418 and the first chroma sample 402. In some embodiments, the left, left top, and top neighboring samples 1002L, 1002LT, and 1002T are unavailable yet, but need to be used to in CfL prediction. The left, left top, and top neighboring samples 1002L, 1002LT, and 1002T are padded with adjacent samples in the coding block 406, e.g., in an intra angular prediction mode. In some embodiments, In some embodiments, only the left neighboring samples 1002L are available and used in CfL prediction to determine the target chroma sample 418 and the first chroma sample 402. In some embodiments, the current coding block 400 is located at a super block boundary. For samples in the top neighboring coding block 406T, only samples in a nearest above reference line are downsampled and used in CFL prediction to determine the target chroma sample 418 and the first chroma sample 402. The nearest above reference line is included in the top neighboring coding block 406T if the top neighboring coding block 406T is at a super block boundary. In some embodiments, neighboring samples 1002 in the nearest adjacent reference line is used in CfL prediction to determine the target chroma sample 418 and the first chroma sample 402. In some embodiments, only the nearest adjacent line of neighboring samples of co-located luma block are used in CfL prediction to determine the target chroma sample 418 and the first chroma sample 402. When reference samples are down-sampled, two lines are used. The nearest adjacent reference line refers to the line that closer to the current coding block 400.

In some embodiments, luma samples in the current coding block 400 are down-sampled according to a chroma color format (e.g., 4:2:0, 4:2:2, 4:4:4). In some embodiments, luma samples in the neighboring coding block 400 are down-sampled according to a chroma color format (e.g., 4:2:0, 4:2:2, 4:4:4). In some embodiments, luma samples in the one or more neighboring coding blocks 406 are used to do CfL prediction and determine the target chroma sample 418 and the first chroma sample 402.

In some embodiments, the plurality of luma samples of the current or neighboring coding blocks 400 or 406 are not downsampled and applied to determine the target chroma sample 418 and the first chroma sample 412. The first luma sample 402 and target luma sample 408 are not down-sampled. The target luma sample 408 is identified from the plurality of candidate luma samples 404 that are not down-sampled. Each chroma sample is co-located with a set of luma samples (e.g., 2×2 samples). Alternatively, in some embodiments, the plurality of luma samples of the current or neighboring coding blocks 400 or 406 are downsampled and applied to determine the target chroma sample 418 and the first chroma sample 412. For a down-sampled first luma sample 402, a down-sampled target luma sample 408 is identified from a plurality of down-sampled candidate luma samples 404. The first or target chroma sample is co-located with a respective down-sampled luma sample (e.g., corresponding to 2×2 samples that are not down-sampled). The first chroma sample 412 is determined from the target chroma sample 418.

Figure 11:
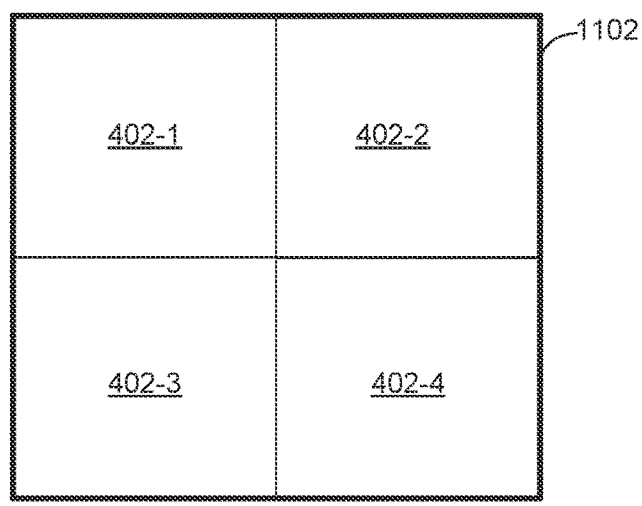
FIG. 11 illustrates a chroma subsampling scheme applied to subsample luma samples of a current coding block 400 and one or more neighboring coding blocks of a current frame, in accordance with some embodiments.

FIG. 11 illustrates a chroma subsampling scheme 1100 applied to subsample luma samples of a current coding block 400 and one or more neighboring coding blocks 406 (e.g., 406T and 406L) of a current frame, in accordance with some embodiments. In some embodiments, the current coding block 400 includes a plurality of luma samples that further includes a top boundary row of luma samples that are immediately adjacent to a top boundary and a left boundary column of luma samples that are immediately adjacent to a left boundary. In some embodiments, the top boundary row and the left boundary column of luma samples of the current coding block 400 are used to determine the target luma sample 408 and co-located target chroma sample 418 in the one or more neighboring coding block 406.

In some embodiments, a chroma color format is 4:2:0, and the plurality of luma samples of each coding block 400 or 406 is grouped to a plurality of luma pixel groups (also called luma blocks). Each luma pixel group 1102 (i.e., each luma block 1102) includes an array of 2×2 luma samples 402-1, 402-2, 402-3, and 402-4. For each of the plurality of luma pixel groups 1102, a single luma sample is selected from, or determined based on, the array of 2×2 luma samples to represent the respective luma pixel group 1102. Specifically, each coding block 400 or 406 has a plurality of chroma samples that has the same resolution as the plurality of luma pixel groups 1102. Each chroma sample is co-located with a respective luma pixel group 1102, and determined based on a target chroma sample 418 co-located with a target luma sample 408 (e.g., corresponding to a target luma pixel group) in the one or more neighboring coding blocks 406. In an example, the luma samples of the one or more neighboring coding blocks 406 are downsampled to one luma sample for every 2×2 luma samples. Optionally, the resulting luma sample corresponds to the luma sample 402-1, 402-2, 402-3, or 402-4 of a neighboring coding block 406. Optionally, the resulting luma sample is a combination (e.g., an average, a weighted average) of the luma sample 402-1, 402-2, 402-3, or 402-4 of the neighboring coding block 406. In another example, the luma samples of the current coding blocks 400 are also downsampled to one luma sample for every 2×2 luma samples. Optionally, the resulting luma sample corresponds to the luma sample 402-1, 402-2, 402-3, or 402-4 of the current coding block 400. Optionally, the resulting luma sample is a combination (e.g., an average, a weighted average) of the luma sample 402-1, 402-2, 402-3, or 402-4 of the current coding block 400. In some embodiments, the resulting downsampled luma samples of the coding blocks 400 and 406 are used as luma samples 402, 405, and 408 to determine the target chroma sample 418 and first chroma sample 412. In some embodiments, this down-sampling scheme is broadly applied in a CfL mode that optionally applies luma samples to predict chroma samples or involves cross component prediction including CfL.

Figure 12:
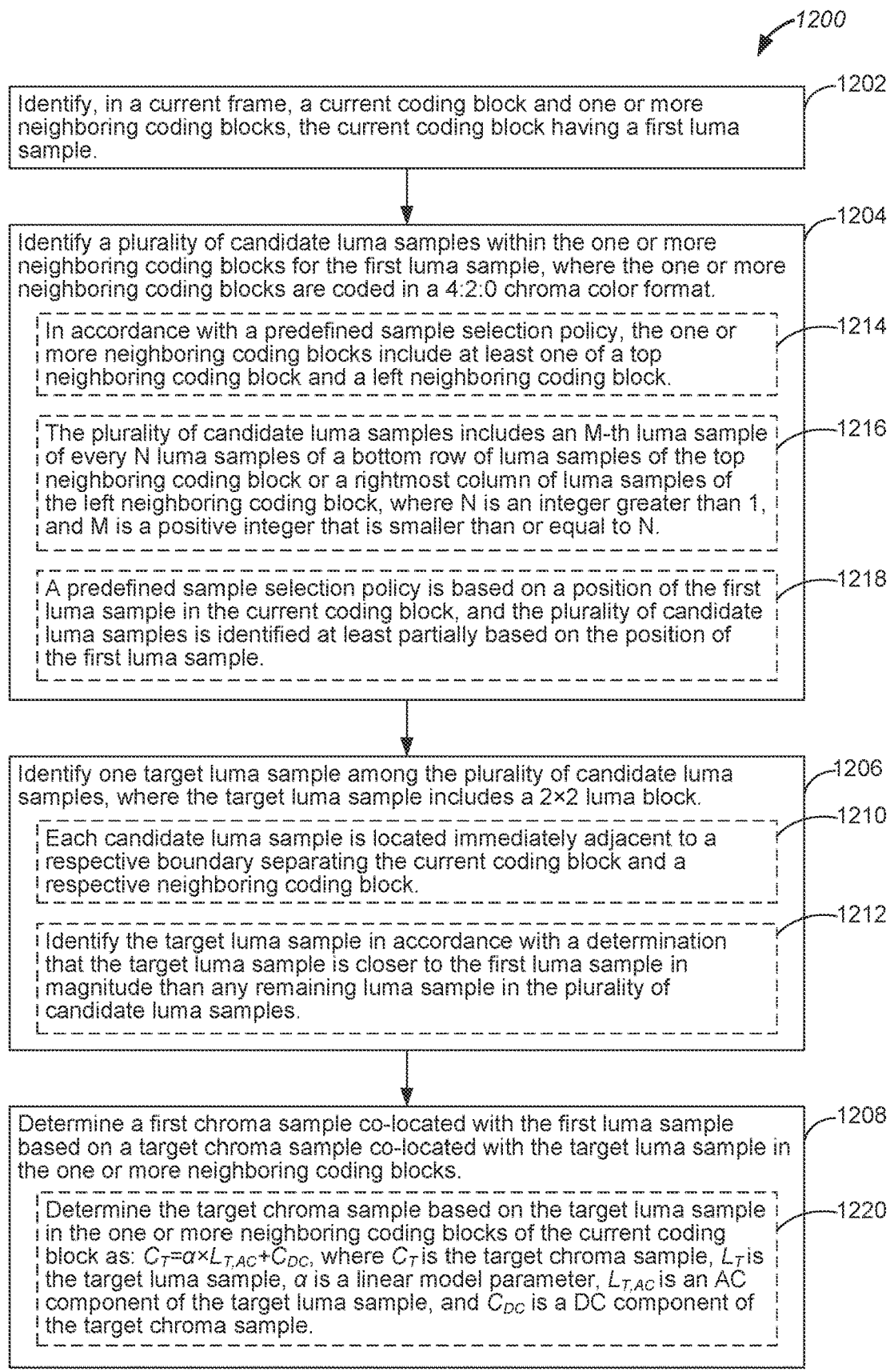
FIG. 12 is a flow diagram illustrating a method of coding video in accordance with some embodiments.

FIG. 12 is a flow diagram illustrating a method 1200 of coding video in accordance with some embodiments. The method 1200 may be performed at a computing system (e.g., the server system 112, the source device 102, or the electronic device 120) having control circuitry and memory storing instructions for execution by the control circuitry. In some embodiments, the method 1200 is performed by executing instructions stored in the memory (e.g., the coding module 320 of the memory 314) of the computing system. In some embodiments, the computing system determines a chroma prediction block from luma samples in a co-located luma coding block 400 and neighboring samples 404 of the co-located luma coding block 406. For example, a luma reconstruction sample 402 ($PL_{ij}$) (also called a first luma sample) is located (1202) at a sample position (i, j) of a current coding block 400 having one or more neighboring coding blocks 406 that are immediately adjacent to the current coding block 400. A plurality of candidate luma samples 404 are included (1204) in the one or more neighboring coding blocks 406 that further include (1214) a left neighboring coding block 406L, a top neighboring coding block 406T, or both. The computing system identifies (1206) a target luma sample 408 ($PL_k$) among the plurality of candidate luma samples 404. Among the candidate luma samples 404, the target luma sample 408 ($PL_k$) has (1212) the smallest difference with the luma reconstruction sample 402 ($PL_{ij}$) in magnitude. In some situations, more than one candidate luma samples 404 have the same smallest difference with the luma reconstruction sample 402 ($PL_{ij}$), the target luma sample 408 ($PL_k$) having the smallest sample distance from the sample 402 ($PL_{ij}$) is selected. A target chroma sample 418 ($PC_k$) co-located with the target luma sample 408 ($PL_k$) is used to predict (1208) a chroma reconstruction sample 412 ($PC_{ij}$) co-located with the luma reconstruction sample 402 ($PL_{ij}$). In an example, a luma value of the luma reconstruction sample 402 ($PL_{ij}$) is 111, and the value of the target luma sample 408 at a position k is 113, which has the smallest difference with the luma reconstruction sample 402 ($PL_{ij}$) compared with other candidate luma samples 404 in the left neighboring coding block 406L and top neighboring coding block 406T. The target chroma sample 418 ($PC_k$) co-located with the target luma sample 408 ($PL_k$) is used to define the chroma reconstruction sample 412 ($PC_{ij}$) co-located with the luma reconstruction sample 402 ($PL_{ij}$). In some embodiments, a CfL mode is applied for the current coding block 400. The chroma reconstruction sample 412 ($PC_{ij}$) is determined from the co-located luma reconstruction sample 402 ($PL_{ij}$). Optionally, a signal α is not signaled to determine the chroma reconstruction sample 412 ($PC_{ij}$). Optionally, a value of the signal α is always set to zero. The target chroma sample 418 ($PC_k$) is set as the final prediction value for the chroma sample at the position (i, j). In some embodiments, the one or more neighboring coding blocks 406 are coded in a 4:2:0 chroma color format, and the target luma sample 408 includes a 2×2 luma block.

In some embodiments, a difference between the luma reconstruction sample 402 ($PL_{ij}$) and each of the plurality of candidate luma samples 404 is determined based on a sum of absolute difference (SAD) or a sum of squared error (SSE). Alternatively, in some embodiments, the difference between the luma reconstruction sample 402 ($PL_{ij}$) and each candidate luma sample 404 is determined based on a weighted sum of a first SAD or SSE between the luma reconstruction sample 402 ($PL_{ij}$) and the candidate luma sample and at least one second SAD or SSE between the luma reconstruction sample 402 ($PL_{ij}$) and a neighboring luma sample of the candidate luma sample 404.

In some embodiments, neighboring samples 1002 (FIG. 10) are applied to calculate a DC or AC component of CfL prediction, it can be further simplified. Further, in some embodiments, a subset (not all) of neighboring samples 1002 that are immediately adjacent to the current coding block 400 are applied to determine the target luma sample 408 and the target chroma sample 418.

In some embodiments, one of every two neighboring luma samples of a bottom row of a top neighboring coding block 406T and a rightmost column of a left neighboring coding block 406L is used as a candidate luma sample to determine a target luma sample 408 for each luma sample of the current coding block 400. Specifically, in some embodiments (FIG. 5), a first luma sample 402 is located at an even-numbered column or an even-numbered row of the current coding block 400. Even-numbered neighboring luma samples of the bottom row of the top neighboring coding block 406T and even-numbered neighboring luma samples of the rightmost column of the left neighboring coding block 406L are used as candidate luma samples 404 from which the target luma sample 408 is selected for the first luma sample 402 in the current coding block 400. Conversely, in some embodiments, the first luma sample 402 is located at an intersection of an odd-numbered column and an odd-numbered row of the current coding block 400. Odd-numbered neighboring luma samples of the bottom row of the top neighboring coding block 406T and odd-numbered neighboring luma samples of the rightmost column of the left neighboring coding block 406L are used as the candidate luma samples 404 from which the target luma sample 408 is selected for the first luma sample 402 in the current coding block 400. Further, a first chroma sample 412 co-located with the first luma sample 402 is then determined based on the target chroma sample 418 co-located with the target luma sample 408 in the one or more neighboring coding blocks 406 (e.g., a top neighboring coding block 406T, a left neighboring coding block 406L).

In some embodiments, an M-th luma sample of every N luma samples in the bottom row of the top neighboring coding block 406T and the rightmost column of the left neighboring coding block is used (1216) as a candidate luma sample from which the target luma sample is selected and used to determine the first chroma sample co-located with the first luma sample 402 in the current coding block 400. In an example, M is an integer that is equal to 2, 3, 4, . . . , or N, where N is equal to or smaller than a total number of luma samples in each row or column of the current coding block 400. In another example, N is equal to an integer power of 2 and less than a total number of luma samples in the bottom row of the top neighboring coding block 406T or the rightmost column of the left neighboring coding block.

In some embodiments (FIG. 6), a subset of neighboring samples are located in a central portion of the bottom row of the top neighboring coding block 406T and a central portion of the rightmost column of the left neighboring coding block 406L, and used as candidate luma sample from which a target luma sample is selected. The candidate luma samples include central K central luma samples of the bottom row of the top neighboring coding block 406T and L central luma samples of the rightmost column of the left neighboring coding block 406L, where K is an integer greater than 1. In some embodiments, K is hard coded in the encoder 106 and decoder 122. Alternatively, in some embodiments, K is signaled in a bitstream communicated between the encoder 106 and decoder 122.

In some embodiments (FIG. 7), the candidate luma samples from which the target luma sample is selected include two sets of P luma samples located at two ends of the bottom row of the top neighboring coding block 406T and two sets of Q luma samples located at two ends of the rightmost column of the left neighboring coding block 406L. In an example, P and Q are both equal to 1. The candidate luma samples include four luma samples each of which is located at a distinct end of the bottom row of the top neighboring coding block 406T and the rightmost column of the left neighboring coding block 406L.

In some embodiments, the candidate luma samples from which the target luma sample is selected vary (1218) for the first luma sample 402 based on a position of the first luma sample 402 in the current coding block 400. Referring to FIG. 9A, in some embodiments, the first luma sample 402 has only two candidate luma samples that are neighboring to the current coding block 400. A first candidate luma sample is located in the bottom row of the top neighboring coding block 406T, and aligned with the first luma sample 402 in the same column. A second candidate luma sample is located in the rightmost column of the left neighboring coding block 406L, and aligned with the first luma sample 402 in the same row. Referring to FIG. 8A, in some embodiments, the first luma sample 402 has only two sets of candidate luma samples that are neighboring to the current coding block 400. A first set of X candidate luma samples is located in the bottom row of the top neighboring coding block 406T, and has a first center luma sample that is aligned with the first luma sample 402 in the same column. A second set of Y candidate luma samples is located in the rightmost column of the left neighboring coding block 406L, and has a second center luma sample that is aligned with the first luma sample 402 in the same row. X and Y are positive odd numbers greater than 1.

In some embodiments, the target chroma sample 418 is co-located with the target luma sample 408 and determined (1220) based on the target luma sample 408 using equation (1) in a CfL mode. The target chroma sample 418 has a DC component, which is determined based on one or more neighboring chroma samples of the target chroma sample 408. The one or more neighboring chroma samples of the target chroma samples are processed by at least an average operation and a shift operation without using any division operation. In some embodiments, an average operation is applied on left neighboring samples of the target luma sample as follows:

$$\text{Average}_L = (\text{sum} + (\text{height} >> 1)) >> \text{height\_log } 2. \quad (2)$$

where Sum is a sum of the left neighboring samples, and height_log 2 is a log 2 value of a block height. Further, in some embodiments, a rounding value height>>1 is ignored. Equation (2) is simplified as follows:

$$\text{Average}_L = (\text{sum}) >> \text{height\_log } 2. \quad (3)$$

In some embodiments, during the course of determining a top sample average Average$_T$, the computing system applies a shift operation rather than a division operation as follows:

$$\text{Average}_T = (\text{sum} + (\text{width} >> 1)) >> \text{width\_log } 2. \quad (4)$$

where width_log 2 is a log 2 value of a block width. Further, in some embodiments, the rounding value width>>1 is ignored. Equation (4) is simplified as follows:

$$\text{Average}_T = (\text{sum}) >> \text{width\_log } 2. \quad (4)$$

Additionally, in some embodiments, the top and left sample averages Average$_L$ and Average$_T$ are averaged by sum and shifted by one as follows:

$$\text{Average} = (\text{Average}_L + \text{Average}_T + ((\text{width} + \text{height}) >> 1)) >> 1. \quad (5)$$

Further, in some embodiments, the rounding vale (width+height)>>1 is ignored, such that the average Average is represented as follows:

$$\text{Average} = (\text{Average}_L + \text{Average}_T) >> 1. \quad (5)$$

Further, in some embodiments, the sum of Average$_L$ and Average$_L$ is increased by a round offset, and this round offset is optionally 1, 2, . . . , $N_R$, where $N_R$ is a positive integer.

In some embodiments, the block width width is greater than the block height height for the current coding block 400. The top neighboring samples are used to determine the top sample average Average$_T$, which approximately represents the average Average that determines the DC component of the target chroma sample 418 in the CfL mode. Conversely, In some embodiments, the block height height is greater than the block width width for the current coding block 400. The left neighboring samples are used to determine the left sample average Average$_L$, which approximately represents the average Average that determines the DC component of the target chroma sample 418 in the CfL mode.

Although FIG. 12 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 1200) of video coding (e.g., video decoding). The method includes identifying (1202), in a current frame, a current coding block and one or more neighboring coding blocks, the current coding block having a first luma sample. The method further includes identifying (1204) a plurality of candidate luma samples within the one or more neighboring coding blocks for the first luma sample. The one or more neighboring coding blocks are coded in a 4:2:0 chroma color format. The method further includes identifying (1206) one target luma sample among the plurality of candidate luma samples and determining (1208) a first chroma sample co-located with the first luma sample based on a target chroma sample co-located with the target luma sample in the one or more neighboring coding blocks. The target luma sample includes a 2×2 luma block.

(A2) In some embodiments of A1, each candidate luma sample is located (1210) (e.g., immediately) adjacent to a respective boundary separating the current coding block and a respective neighboring coding block.

(A3) In some embodiments of A1 or A2, identifying the target luma sample further includes identifying (1212) the target luma sample in accordance with a determination that the target luma sample is closer to the first luma sample in magnitude than any remaining luma sample in the plurality of candidate luma samples.

(A4) In some embodiments of any of A1-A3, in accordance with a predefined sample selection policy, the one or more neighboring coding blocks include (1214) at least one of a top neighboring coding block and a left neighboring coding block.

(A5) In some embodiments of A4, the plurality of candidate luma samples includes all luma samples of a bottom row of luma samples of the top neighboring coding block or a rightmost column of luma samples of the left neighboring coding block.

(A6) In some embodiments of A4 or A5, the plurality of candidate luma samples includes (1216) an M-th luma sample of every N luma samples of a bottom row of luma samples of the top neighboring coding block or a rightmost column of luma samples of the left neighboring coding block, where N is an integer greater than 1, and M is a positive integer that is smaller than or equal to N. (A7) In some embodiments of A6, N is equal to an integer power of 2 and less than a total number of luma samples in the bottom row of luma samples of the top neighboring coding block.

(A8) In some embodiments of any of A4-A7, the plurality of candidate luma samples includes a set of K luma samples in the middle of a bottom row of luma samples of the top neighboring coding block or a set of L luma samples in the middle of a rightmost column of luma samples of the left neighboring coding block, where K and L are positive integers.

(A9) In some embodiments of any of A4-A8, the plurality of candidate luma samples includes two set of P luma samples at two ends of a bottom row of luma samples of the top neighboring coding block or two set of Q luma samples at two ends of a rightmost column of luma samples of the left neighboring coding block, where P and Q are positive integers.

(A10) In some embodiments of any of A1-A9, a predefined sample selection policy is (1218) based on a position of the first luma sample in the current coding block. In accordance with the predefined sample selection policy, the plurality of candidate luma samples is identified at least partially based on the position of the first luma sample. (A11) In some embodiments of A10, in accordance with the predefined sample selection policy, the one or more neighboring coding blocks include a top neighboring coding block or a left neighboring coding block. Identifying the plurality of candidate luma samples further comprising implementing at least one of: identifying an odd number X of luma samples including a first central luma sample in a bottom row of luma samples of the top neighboring coding block and identifying an odd number Y of luma samples including a second central luma sample in a rightmost column of luma samples of the left neighboring coding block. The first central luma sample is aligned with the first luma sample along a column direction, and the second central luma sample is aligned with the first luma sample along a row direction.

(A12) In some embodiments of any of A1-A11, the method 1200 further includes determining (1220) the target chroma sample based on the target luma sample in the one or more neighboring coding blocks of the current coding block as follows:

$$C_T = \alpha \times L_{T,AC} + C_{DC} \tag{1}$$

where $C_T$ is the target chroma sample, $L_T$ is the target luma sample, $\alpha$ is a linear model parameter, $L_{T,AC}$ is an AC component of the target luma sample, and $C_{DC}$ is a DC component of the target chroma sample.

(A13) In some embodiments of any of A1-A12, the method 1200 further includes subsampling the plurality of luma samples of the current coding block of the current frame and the one or more neighboring coding blocks based on the 4:2:0 chroma color format. (A14) In some embodiments of A13, subsampling the plurality of luma samples further includes grouping the plurality of luma samples to a plurality of luma pixel groups each of which includes an array of 2×2 luma samples and for each of the plurality of luma pixel groups, selecting a single luma sample from the array of 2×2 luma samples to represent the respective luma pixel group.

(A15) In some embodiments of any of A1-A14, the method 1200 further includes identifying a coding block mode of the current coding block. In accordance with a determination that the coding block mode is a chroma copying mode, the first chroma sample is determined based on the target chroma sample co-located with the target luma sample in the one or more neighboring coding blocks of the current coding block.

(A16) In some embodiments of any of A1-A15, identifying the target luma sample further includes identifying a subset of candidate luma samples from the plurality of candidate luma samples, in accordance with a determination that the subset of candidate luma samples differ equally from the first luma sample in magnitude, and are closer to the first luma sample in magnitude than any remaining luma sample in the plurality of candidate luma samples. Identifying the target luma sample further includes selecting the target luma sample from the subset of candidate luma samples based on a distance of the target luma sample from the first luma sample. (A17) In some embodiments of A16, selecting the target luma sample further includes for each of the subset of candidate luma samples, determining a respective distance between the first luma sample and the respective candidate luma sample and in accordance with a determination that a distance of one of the subset of candidate luma samples is smallest among respective distances of the subset of candidate luma samples, selecting the one of the subset of candidate luma samples as the target luma sample.

(A18) In some embodiments of any of A1-A17, determining the first chroma sample co-located with the first luma sample further includes copying the target chroma sample co-located with the target luma sample to the first chroma sample co-located with the first luma sample.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A18 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A18 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, comprising:
receiving a video bitstream comprising a plurality of frames, including a current frame containing a current coding block and one or more neighboring coding blocks; and
identifying a first chroma sample of the current coding block by performing a chroma-from-luma (CfL) prediction without relying on a linear relationship between the first chroma sample and a co-located first luma sample, wherein performing the CfL prediction consists essentially of:
identifying the first luma sample co-located with the first chroma sample;
identifying a plurality of candidate luma samples within the one or more neighboring coding blocks for the first luma sample, wherein the one or more neighboring coding blocks are coded in a 4:2:0 chroma color format;
identifying a target luma sample among the plurality of candidate luma samples, the target luma sample comprising a 2×2 luma block; and
copying a target chroma sample co-located with the target luma sample to the first chroma sample.

2. The method of claim 1, wherein each candidate luma sample is located adjacent to a respective boundary separating the current coding block and a respective neighboring coding block.

3. The method of claim 1, wherein identifying the target luma sample further comprises:
identifying the target luma sample in accordance with a determination that the target luma sample is closer to the first luma sample in magnitude than any remaining luma sample in the plurality of candidate luma samples.

4. The method of claim 1, wherein in accordance with a predefined sample selection policy, the one or more neighboring coding blocks include at least one of a top neighboring coding block and a left neighboring coding block.

5. The method of claim 4, wherein the plurality of candidate luma samples includes all luma samples of a bottom row of luma samples of the top neighboring coding block or a rightmost column of luma samples of the left neighboring coding block.

6. The method of claim 4, wherein the plurality of candidate luma samples includes an M-th luma sample of every N luma samples of a bottom row of luma samples of the top neighboring coding block or a rightmost column of luma samples of the left neighboring coding block, where N is an integer greater than 1, and M is a positive integer that is smaller than or equal to N.

7. The method of claim 6, wherein N is equal to an integer power of 2 and less than a total number of luma samples in the bottom row of luma samples of the top neighboring coding block.

8. The method of claim 4, wherein the plurality of candidate luma samples includes a set of K luma samples in the middle of a bottom row of luma samples of the top neighboring coding block or a set of L luma samples in the middle of a rightmost column of luma samples of the left neighboring coding block, where K and L are positive integers.

9. The method of claim 4, wherein the plurality of candidate luma samples includes two set of P luma samples at two ends of a bottom row of luma samples of the top neighboring coding block or two set of Q luma samples at two ends of a rightmost column of luma samples of the left neighboring coding block, where P and Q are positive integers.

10. The method of claim 1, wherein a predefined sample selection policy is based on a position of the first luma sample in the current coding block, and in accordance with the predefined sample selection policy, the plurality of candidate luma samples is identified at least partially based on the position of the first luma sample.

11. The method of claim 10, wherein in accordance with the predefined sample selection policy, the one or more neighboring coding blocks include a top neighboring coding block or a left neighboring coding block, identifying the plurality of candidate luma samples further comprising implementing at least one of:
identifying an odd number X of luma samples including a first central luma sample in a bottom row of luma samples of the top neighboring coding block; and
identifying an odd number Y of luma samples including a second central luma sample in a rightmost column of luma samples of the left neighboring coding block;
wherein the first central luma sample is aligned with the first luma sample along a column direction, and the second central luma sample is aligned with the first luma sample along a row direction.

12. A method for encoding video data, comprising:
receiving video data comprising a plurality of frames, including a current frame containing a current block and one or more neighboring blocks; and
encoding a first chroma sample of the current block according to a chroma-from-luma (CfL) prediction without relying on a linear relationship between the first chroma sample and a co-located first luma sample, wherein performing the CfL prediction consists essentially of:
identifying the first luma sample co-located with the first chroma sample;
identifying a plurality of candidate luma samples within the one or more neighboring blocks for the first luma sample, wherein the one or more neighboring blocks are coded in a 4:2:0 chroma color format;
identifying a target luma sample among the plurality of candidate luma samples, the target luma sample comprising a 2×2 luma block; and
copying a target chroma sample co-located with the target luma sample to the first chroma sample.

13. The method of claim 12, wherein each candidate luma sample is located adjacent to a respective boundary separating the current block and a respective neighboring block.

14. The method of claim 12, wherein the target luma sample is identified in accordance with a determination that the target luma sample is closer to the first luma sample in magnitude than any remaining luma sample in the plurality of candidate luma samples.

15. The method of claim 12, wherein, in accordance with a predefined sample selection policy, the one or more neighboring blocks include at least one of a top neighboring block and a left neighboring block.

16. The method of claim 12, wherein a predefined sample selection policy is based on a position of the first luma sample in the current block, and in accordance with the predefined sample selection policy, the plurality of candidate luma samples is identified at least partially based on the position of the first luma sample.

17. A method of processing visual media data, the method comprising:
- obtaining a source video sequence that comprises a plurality of frames; and
- performing a conversion between the source video sequence and a video bitstream of visual media data according to a format rule;
- wherein the video bitstream comprises a plurality of frames, including a current frame containing a current coding block and one or more neighboring coding blocks;
- wherein the format rule specifies that a first chroma sample of the current coding block is to be identified by performing a chroma-from-luma (CfL) prediction without relying on a linear relationship between the first chroma sample and a co-located first luma sample;
- wherein performing the CfL prediction consists essentially of:
  - identifying the first luma sample co-located with the first chroma sample;
  - identifying a plurality of candidate luma samples within the one or more neighboring coding blocks for the first luma sample, wherein the one or more neighboring coding blocks are coded in a 4:2:0 chroma color format;
  - identifying a target luma sample among the plurality of candidate luma samples, the target luma sample comprising a 2×2 luma block; and
  - copying a target chroma sample co-located with the target luma sample to the first chroma sample.

18. The method of claim 17, wherein each candidate luma sample is located adjacent to a respective boundary separating the current coding block and a respective neighboring coding block.

19. The method of claim 17, wherein, in accordance with a predefined sample selection policy, the one or more neighboring coding blocks include at least one of a top neighboring coding block and a left neighboring coding block.

* * * * *